(12) United States Patent
Siemer et al.

(10) Patent No.: US 8,791,271 B2
(45) Date of Patent: Jul. 29, 2014

(54) PROCESS FOR PREPARING POLYMERIC, IONIC IMIDAZOLIUM COMPOUNDS

(75) Inventors: Michael Siemer, Mannheim (DE); Sebastian Koltzenburg, Dannstadt-Schauernheim (DE); Michael Klein, Reichenbach-Steegen (DE)

(73) Assignee: BASF SE, Ludwigshafen (DE)

( * ) Notice: Subject to any disclaimer, the term of this patent is extended or adjusted under 35 U.S.C. 154(b) by 249 days.

(21) Appl. No.: 13/141,623

(22) PCT Filed: Dec. 10, 2009

(86) PCT No.: PCT/EP2009/066781
§ 371 (c)(1),
(2), (4) Date: Jun. 22, 2011

(87) PCT Pub. No.: WO2010/072571
PCT Pub. Date: Jul. 1, 2010

(65) Prior Publication Data
US 2011/0263810 A1 Oct. 27, 2011

(30) Foreign Application Priority Data
Dec. 22, 2008 (EP) .................................. 08172490

(51) Int. Cl.
*C08G 12/06* (2006.01)
*C08G 12/04* (2006.01)

(52) U.S. Cl.
USPC .................. 548/335.1; 548/341.1; 528/266; 528/269; 528/245

(58) Field of Classification Search
CPC ................................................ H01M 10/0569
USPC ............. 528/266, 269, 245; 548/335.1, 341.1
See application file for complete search history.

(56) References Cited

U.S. PATENT DOCUMENTS

| 5,077,414 A | 12/1991 | Arduengo |
| 2009/0227740 A1 | 9/2009 | Ying et al. |

FOREIGN PATENT DOCUMENTS

| JP | 05165258 | 7/1993 |
| JP | 2004 217565 | 8/2004 |
| JP | 2004 333566 | 11/2004 |
| WO | 91 14678 | 10/1991 |
| WO | 99 37276 | 7/1999 |
| WO | 2007 114792 | 10/2007 |
| WO | 2008 110007 | 9/2008 |
| WO | 2009 074535 | 6/2009 |

OTHER PUBLICATIONS

U.S. Appl. No. 13/511,051, filed May 21, 2012, Neu, et al.
English translation of the International Preliminary Report on Patentability and Written Opinion of the International Searching Authority issued Jul. 7, 2011, in PCT/EP2009/066781.
Kazuharu Suzuki, et al. "A new alkyl-imidazole polymer prepared as an inonic polymer electrolyte by in situ polymerization of dye sensitized solar cells", Journal of Photochemistry and Photobiology A: Chemistry, vol. 164, XP-002533267, Jan. 1, 2004, pp. 81-85.
U.S. Appl. No. 13/701,217, filed Nov. 30, 2012, Siemer, et al.
Toda, H. et al., "Bile Acid Binding and Hypocholesterolemic Activity of a New Anion Exchange Resin From 2-Methylimidazol and Epichlorohydrin", Journal of Pharmaceutical Sciences, vol. 77, No. 6, Total 3 Pages, (Jun. 1988).
Martinez, J. M., et al., "Synthesis, FTIR, Solid-State NMR and SEM Studies of Novel Polyampholytes or Polyelectrolytes Obtained From EDGE, MAA and Imidazoles", European Polymer Journal, vol. 44, pp. 392-407, (2008).
International Search Report Issued Mar. 12, 2010 in PCT/EP09/066781 filed Dec. 10, 2009.

*Primary Examiner* — Duc Truong
(74) *Attorney, Agent, or Firm* — Oblon, Spivak, McClelland, Maier & Neustadt, L.L.P.

(57) ABSTRACT

Process for preparing polymeric, ionic compounds comprising imidazolium groups, wherein
an $\alpha$-dicarbonyl compound,
an aldehyde,
at least one amino compound having at least two primary amino groups,
if appropriate an amino compound having only one primary amino group and a
protic acid,
where the carbonyl groups of the $\alpha$-dicarbonyl compound and of the aldehyde may, if appropriate, also be present as hemiacetal, acetal or hemiketal or ketal,
are reacted with one another.

18 Claims, No Drawings

PROCESS FOR PREPARING POLYMERIC, IONIC IMIDAZOLIUM COMPOUNDS

DESCRIPTION

The invention relates to a process for preparing polymeric, ionic compounds comprising imidazolium groups (polymeric, ionic imidazolium compounds for short), wherein
an α-dicarbonyl compound,
an aldehyde,
at least one amino compound having at least two primary amino groups,
if appropriate an amino compound having only one primary amino group and a
protic acid,
where the carbonyl groups of the α-dicarbonyl compound and of the aldehyde may, if appropriate, also be present as hemiacetal, acetal or hemiketal or ketal,
are reacted with one another.

Imidazolium salts are of importance as ionic liquids. Various processes for synthesizing imidazolium salts have therefore been developed.

WO 91/14678 describes a single-stage process for preparing imidazolium salts from an α-dicarbonyl compound, an aldehyde, an amine and an acid. Water is removed by azeotropic distillation using toluene as entrainer.

A further development of the above process is known from the as yet unpublished PCT/EP/2008/067014 (PF 60394).

Polymeric imidazolium compounds and processes for preparing them are already known. Thus, for example, WO 99/37276 describes polymeric imidazolium compounds which can be obtained by reaction of diamines, in particular compounds having two imidazole groups, with dibromo compounds. The cationic imidazolium polymers obtained have bromide anions as counterion. Halide anions are undesirable for many applications since they are corrosive. They are used in cosmetic compositions. Corresponding compounds and their use as phase transfer catalysts are also known from Journal of Fluorine Chemistry 128 (2007), pages 608 to 611.

Another process is described in European Polymer Journal 44 (2008) 392-407. Diglycidyl ether and imidazole are reacted to form polymeric imidazolium compounds having hydroxy groups in the main polymer chain. These are esterified with acrylic acid, so that the polymer obtained is free-radically crosslinkable. The crosslink polymer is suitable, for example, for ion chromatography or other separation processes.

JP 2004217565 and Hiedo Toda, Kunio Kihara, Munehiro Hashimoto and Susumu Mizogami, Journal of Pharmaceutical Sciences, Vol. 77, No. 6, June 1988, discloses the reaction of imidazole derivatives with epichlorohydrin to give polymeric imidazolium compounds and their use as ion-exchange resin. The reaction with epichlorohydrin or other epoxy compounds necessarily give compounds having a hydroxy group in the β position relative to the nitrogen atom of the imidazole ring.

It was an object of the present invention to discover alternative polymeric imidazolium compounds and an alternative process for preparing polymeric imiazolium compounds. The process should be able to be carried out very simply in industry and make it possible to prepare polymeric imidazolium compounds in high yields. The polymeric imidazolium compounds should be suitable for a large number of applications which come into consideration for such ionic systems. In particular, they should be able to be used as dispersants, e.g. for inorganic or organic pigments or other solid or liquid particles.

We have accordingly found the process defined at the outset. We have also found novel polymeric, ionic imidazolium compounds and uses for these compounds.

The Starting Compounds for the Preparative Process

According to the invention, an α-dicarbonyl compound, an aldehyde, at least one amino compound having at least two primary amino groups and a protic acid as essential starting materials are reacted with one another. The above compounds are defined by their content of functional groups. For the purposes of the present invention, it is also possible, for example, for two of the above compounds to be identical when, for example, a compound comprises both an acid function and, for example, two primary amino groups or an aldehyde group. The reaction is a polycondensation. In a polycondensation, polymerization occurs with elimination of a low molecular weight compound such as water or alcohol.

In the present case, water is eliminated. When the carbonyl groups of the α-dicarbonyl compound are present completely or partly as ketal and/or the aldehyde group of the aldehyde is present as acetal or hemiacetal, an alcohol is correspondingly eliminated instead of water.

The α-Dicarbonyl Compound

The α-dicarbonyl compound is preferably a compound of the formula I

R1-CO—CO—R2, where R1 and R2 are each, independently of one another, an H atom or an organic radical having from 1 to 20 carbon atoms. The radicals can be branched or unbranched or comprise functional groups which can, for example, contribute to further crosslinking of the polymeric imidazolium compound. In particular, R1 and R2 are hydrocarbon radicals having the indicated number of carbon atoms.

The compound is particularly preferably glyoxal.

The carbonyl groups of the α-dicarbonyl compound can also be present as ketal or hemiketal, preferably as hemiketal or ketal of a lower alcohol, e.g. a C1-C10-alkanol. In this case, the alcohol is eliminated in the later condensation reaction.

The carbonyl groups of the α-dicarbonyl compound are preferably not present as hemiketal or ketal.

The Aldehyde

For the purposes of the present invention, an aldehyde is a compound having at least one aldehyde group. The aldehyde is in particular an aldehyde of the formula II

R3-CHO, where R3 is an H atom or an organic radical having from 1 to 20 carbon atoms. Particular preference is given to formaldehyde; the formaldehyde can also be used in the form of compounds which liberate formaldehyde, e.g. paraformaldehyde or trioxane.

The aldehyde group of the aldehyde can also be present as hemiacetal or acetal, preferably as hemiacetal or acetal of a lower alcohol, e.g. a C1-C10-alkanol. In this case, the alcohol is eliminated in the later condensation reaction.

The aldehyde group is preferably not present as hemiacetal or acetal.

The Amino Compound Having at Least Two Primary Amino Groups

The amino compound is a compound having at least two primary amino groups.

The amino compound can be represented by the general formula III

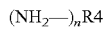

(NH$_2$—)$_n$R4 where n is an integer greater than or equal to 2 and indicates the number of amino groups. n can assume very large values, e.g. n can be an integer from 2 to 10 000, in particular from 2 to 5000. Very high values of n are present, for example, when polyamines such as polyvinylamine are used.

When compounds having n=2 (diamines) are used in the reaction according to the invention, linear, polymeric imidazolium compounds are formed, while in the case of amines having more than two primary amino groups, branched polymers are formed.

In a preferred embodiment, n is an integer from 2 to 6, in particular from 2 to 4. Very particular preference is given to n=2 (diamine) or n=3 (triamine). Very particular preference is given to n=2.

R4 is any n-valent organic radical. The n-valent organic radical can be the radical of a polymer, e.g. a polyvinylamine as mentioned above, and then has a correspondingly high molecular weight.

The organic radical can comprise not only carbon and hydrogen but also heteroatoms such as oxygen, nitrogen, sulfur or halogens, e.g. in the form of functional groups such as hydroxyl groups, ether groups, ester groups, amide groups, aromatic heterocycles, keto groups, aldehyde groups, primary or secondary amino groups, imino groups, thioether groups or halide groups.

Ionic groups, in particular anionic groups or groups which can be converted into anionic groups, e.g. carboxylic acid groups or carboxylate groups, or phosphoric acid groups or phosphonic acid groups abound via an ester linkage are also possible as further functional groups. In the case of such anionic groups, the amino compound simultaneously acts as protic acid in the reaction. The concomitant use of a further protic acid can then be dispensed with; the polymeric imidazolium compound obtained is in this case amphoteric, i.e. it comprises positive and negative charges in the same molecule. An example of an amino compound having two primary amino groups and a carboxyl group is lysine.

The organic radical can be, in particular, a hydrocarbon radical which can be substituted or interrupted by functional groups comprising heteroatoms.

In a preferred embodiment, the amino compound comprises at most ether groups, secondary or tertiary amino groups and apart from these no further functional groups. Mention may be made of, for example, polyether amines. R4 is therefore preferably a pure hydrocarbon radical or a hydrocarbon radical interrupted or substituted by ether groups, secondary amino groups or tertiary amino groups. In a particular embodiment, $R^4$ is a pure hydrocarbon radical and does not comprise any functional groups. The hydrocarbon radical can be aliphatic or aromatic or comprise both aromatic and aliphatic groups.

Possible amino compounds are amino compounds, preferably diamines, in which the primary amino groups are bound to an aliphatic hydrocarbon radical, preferably an aliphatic hydrocarbon radical having from 2 to 50 carbon atoms, particularly preferably from 3 to 40 carbon atoms.

Further possible amino compounds are amino compounds, preferably diamines, in which the primary amino groups are bound directly to an aromatic ring system, e.g. a phenylene or naphthylene group, or amino compounds in which the primary amino groups are bound to aliphatic groups as alkyl substituents of an aromatic ring system.

Diamines which may be mentioned are, in particular, C2-C20-alkylenediamines such as 1,4-butylenediamine or 1,6-hexylenediamine.

Possible triamines are, for example, aliphatic compounds of the formula IV

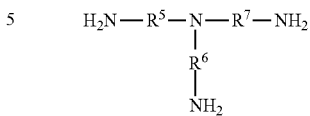

where R5, R6 and R7 are each, independently of one another, a C1-C10 alkylene group, particularly preferably a C2-C6-alkylene group.

In the simplest case, the radicals R5, R6 and R7 have the same meaning; an example which may be mentioned is tri-aminoethylamine (R5=R6=R7=ethylene).

Mention may also be made of compounds having the following structures:

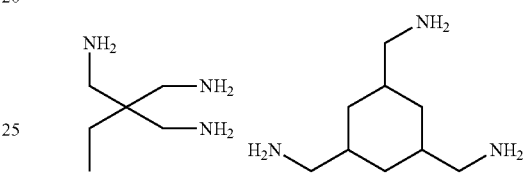

It is also possible to use, in particular, mixtures of amino compounds in the process of the invention. In this way, polymeric imidazolium compounds which comprise different molecular groups between the imidazole rings are obtained. The use of such mixtures makes it possible to set desired properties such as glass transition temperature or elasticity and hardness in a targeted way. Likewise, the solubility in solvents such as water or organic solvents, the tendency to form supramolecular structures and the affinity to other molecules or surfaces can also be set in a targeted manner according to requirements of the intended use.

As mixtures of amino compounds, it is possible to use, for example, mixtures of various aliphatic amino compounds or mixtures of various aromatic amino compounds and also mixtures of aliphatic and aromatic amino compounds. The amino compounds in the mixtures can be amino compounds having different numbers of primary amino groups. When diamines are used in the process of the invention, linear polymers are obtained. When amino compounds having three or more primary amino groups are used, crosslinked and/or branched structures are formed. The use of diamines in admixture with amino compounds having more than two primary amino groups, e.g. triamines, enables the desired degree of crosslinking or degree of branching to be set via the proportion of triamines.

Amino compounds having a hydroxyl group in the β position relative to one of the primary amino groups can also be used as amino compounds. In this case, polymeric imidazolium compounds which have been able to be obtained according to the prior art by reaction of imidazole derivatives with epichlorohydrin or other epoxy compounds (see above) can also be obtained by the process of the invention. However, the use of such compounds is not absolutely necessary for the purposes of the invention, so that it can also be dispensed with.

In a preferred embodiment, the amino compound has a molecular weight of less than 10 000 g/mol, particularly preferably less than 5000 g/mol, very particularly preferably less than 1000 g/mol, in particular less than 500 g/mol.

Possible diamines and triamines are, in particular, compounds having a molecular weight of from 60 to 500 g/mol or from 60 to 250 g/mol.

Other Starting Materials

In the process of the invention, it is possible to use further compounds, e.g. in order to introduce specific end groups into the polymer or bring about additional crosslinking by means of further functional groups, to set defined properties or to make further reactions on the resulting polymer (polymer-analogous reactions) at a later point in time possible.

Thus, if desired, it is possible to make concomitant use of, for example, compounds having only one primary amino group in order to influence the molecular weight of the polymeric imidazolium compounds. The compound having only one primary amino group leads to chain termination and then forms the end group of the polymer chain concerned. The higher the proportion of compounds having only one primary amino group, the lower the molecular weight. Based on 100 mol of amino compounds having at least two primary amino groups, it is possible, in a preferrerd embodiment, to use, for example, from 0 to 10 mol of compounds having only one primary group.

The Protic Acid

The protic acid which is necessarily used can be represented by the formula $Y^{m-}(H^+)_m$, where m is a positive integer. It can also be a polymeric protic acid, e.g. polyacrylic acid; in this case, m can assume very high values. As such polymeric protic acids, mention may be made of, for example, polyacrylic acid, polymethacrylic acid or a copolymer of (meth)acrylic acid, maleic acid, fumaric acid or itaconic acid with any other monomers, e.g. with (meth)acrylates, vinyl esters or aromatic monomers such as styrene, or another polymer having a plurality of carboxyl groups.

In a preferred embodiment, m is an integer from 1 to 4, particularly preferably 1 or 2. In a particular embodiment, m is 1.

The anion $Y^{m-}$ of the protic acid forms the counterion to the imidazolium cations of the polymeric imidazolium compound.

The anion of the protic acid is, for example, selected from:

the group of halides and halogen-comprising anions of the formulae: $F^-$, $Cl^-$, $Br^-$, $I^-$, $BF_4^-$, $PF_6^-$, $AlCl_4^-$, $Al_2Cl_7^-$, $Al_3Cl_{10}^-$, $AlBr_4^-$, $FeCl_4^-$, $BCl_4^-$, $SbF_6^-$, $AsF_6^-$, —$ZnCl_3^-$, $SnCl_3^-$, $CuCl_2^-$;

other anions of known protic acids, e.g.

$CN^-$, $SCN^-$, $OCN^-$, $NO_2^-$, $NO_3^-$, $N(CN)^-$;

the group of sulfates, sulfites and sulfonates of the general formulae:

$SO_4^{2-}$, $HSO_4^-$, $SO_3^{2-}$, $HSO_3^-$, $R^aOSO_3^-$, $R^aSO_3^-$;

the group of carbonates and carbonic esters of the general formulae:

$HCO_3^-$, $CO_3^{2-}$, $R^aCO_3^-$;

the group of silicates and silicic esters of the general formulae:

$SiO_4^{4-}$, $HSiO_4^{3-}$, $H_2SiO_4^{2-}$, $H_3SiO_4^-$, $R^aSiO_4^{3-}$, $R^aR^b SiO_4^{2-}$, $R^aR^bR^c SiO_4^-$, $HR^aSiO_4^{2-}$, $H_2R^aSiO_4^-$, $HR^aR^b SiO_4^-$;

the group of alkylsilane and arylsilane salts of the general formulae:

$R^aSiO_3^{3-}$, $R^aR^bSiO_2^{2-}$, $R^aR^bR^cSiO^-$, $R^aR^bR^cSiO_3^-$, $R^aR^bR^cSiO_2^-$, $R^aR^bSiO_3^{2-}$;

the group of carboximides, bis(sulfonyl)imides and sulfonylimides of the general formulae;

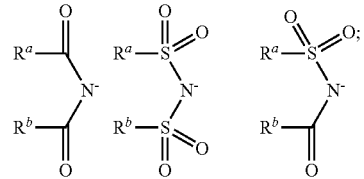

the group of methides of the general formula:

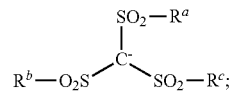

the group of alkoxides and aryloxides of the general formula: $R^aO^-$;

the group of halometalates of the general formula: $[M_rHal_t]^{s-}$, where M is a metal and Hal is fluorine, chlorine, bromine or iodine, r and t are positive integers and indicate the stoichiometry of the complex and s is a positive integer and indicates the charge on the complex;

the group of sulfides, hydrogensulfides, polysulfides, hydrogenpolysulfides and thiolates of the general formulae: $S^{2-}$, $HS^-$, $[S_v]^{2-}$, $[HS_v]^-$, $[R^aS]^-$, where v is a positive integer from 2 to 10;

the group of complex metal ions such as $Fe(CN)_6^{3-}$, $Fe(CN)_6^{4-}$, $MnO_4^-$, $Fe(CO)_4^-$.

The anion of the protic acid is preferably selected from the groups of phosphates of the general formulae: $PO_4^{3-}$, $HPO_4^{2-}$, $H_2PO_4^-$, $R^aPO_4^{2-}$, $HR^aPO_4^-$, $R^aR^bPO_4^-$;

the group of phosphonates and phosphinates of the general formulae:

$R^aHPO_3^-$, $R^aR^bPO_2^-$, $R^aR^bPO_3^-$;

the group of phosphites of the general formulae:

$PO_3^{3-}$, $HPO_3^{2-}$, $H_2PO_3^-$, $R^aPO_3^{2-}$, $R^aHPO_3^-$, $R^aR^bPO_3^-$;

the group of phosphonites and phosphinites of the general formulae:

$R^aR^bPO_2^-$, $R^aHPO_2^-$, $R^aR^bPO^-$, $R^aHPO^-$;

the group of carboxylates of the general formulae:

$R^aCOO^-$; $R^e(—COO^-)_f$;

the group of borates of the general formulae:

$BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$, $B(R^aSO_4)^-$;

the group of boronates of the general formulae: $R^aBO_2^{2-}$, $R^aR^bBO^-$; and the group of halogenated hydrocarbons $CF_3SO_3^-$, $(CF_3SO_3)_2N$—$CF_3CO_2^-$, $CCl_3CO_2^-$.

In the above formulae, $R^a$, $R^b$, $R^c$ and $R^d$ are each, independently of one another, nonacidic hydrogen, $C_1$-$C_{30}$-alkyl and aryl-, heteroaryl-, cycloalkyl-, halogen-, hydroxy-, amino-, carboxy-, formyl-, —O—, —CO—, —CO—O— or —CO—N<substituted derivatives thereof, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_qF_{2(q-a)+(1-b)}H_{2a+b}$ where $q \leq 30$, $0 \leq a \leq q$ and $b=0$ or 1 (for example $CF_3$, $C_2F_5$, $CH_2CH_2-C_{(q-2)}F_{2(q-2)+1}$, $C_6F_{13}$, $C_8F_{17}$, $C_{10}F_{21}$, $C_{12}F_{25}$);

$C_3$-$C_{12}$-cycloalkyl and aryl-, heteroaryl-, cycloalkyl-, halogen-, hydroxy-, amino-, carboxy-, formyl-, —O—, —CO— or —CO—O-substituted derivatives thereof, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_qF_{2(q-a)-(1-b)}H_{2a-b}$ where $q \leq 30$, $0 \leq a \leq q$ and $b=0$ or 1;

$C_2$-$C_{30}$-alkenyl and aryl-, heteroaryl-, cycloalkyl-, halogen-, hydroxy-, amino-, carboxy-, formyl-, —O—, —CO— or —CO—O-substituted derivatives thereof, for example 2-propenyl, 3-butenyl, cis-2-butenyl, trans-2-butenyl or $C_qF_{2(q-a)-(1-b)}H_{2a-b}$ where $q \leq 30$, $0 \leq a \leq q$ and $b=0$ or 1;

$C_3$-$C_{12}$-cycloalkenyl and aryl-, heteroaryl-, cycloalkyl-, halogen-, hydroxy-, amino-, carboxy-, formyl-, —O—, —CO— or —CO—O-substituted derivatives thereof, for example 3-cyclopentenyl, 2-cyclohexenyl, 3-cyclohexenyl, 2,5-cyclohexadienyl or $C_qF_{2(q-a)-3(1-b)}H_{2a-3b}$ where $q \leq 30$, $0 \leq a \leq q$ and $b=0$ or 1;

aryl or heteroaryl having from 2 to 30 carbon atoms and alkyl-, aryl-, heteroaryl-, cycloalkyl-, halogen-, hydroxy-, amino-, carboxy-, formyl-, —O—, —CO— or —CO—O-substituted derivatives thereof, for example phenyl, 2-methylphenyl (2-tolyl), 3-methlhenyl (3-tolyl), 4-methylphenyl, 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl or $C_6F_{(5-a)}H_a$ where $0 \leq a \leq 5$; or two radicals form an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups.

Particular preference is given to $R^a$, $R^b$, $R^c$ and $R^d$ each being, independently of one another, hydrogen and particularly preferably a C1-C10-alkyl group, preferably a C1-C4-alkyl group.

$R^e$ (see above formula for the polybasic carboxylic acid) is an organic radical to which a plurality of carboxylic acid groups are bound. Correspondingly, f is an integer of at least 2. Such polybasic carboxylic acids can be, for example, maleic acid or itaconic acid, phthalic acid, isophthalic acid or terephthalic acid; other possibilities are polymeric compounds which can be obtained, for example, by free-radical polymerization of ethylenically unsaturated compounds using, possibly among others, monomers having one or two carboxylic acid groups, e.g. (meth)acrylic acid.

The anion of a protic acid is preferably the anion of a protic acid having a $pK_a$ of at least 1, in particular at least 2 and in a very particularly preferred embodiment at least 4 (measured at 25° C., 1 bar, in water or dimethyl sulfoxide).

The $pK_a$ is the negative logarithm to the base 10 of the acid constant, $K_a$. The $pK_a$ is for this purpose measured at 25° C., 1 bar, either in water or dimethyl sulfoxide as solvent; it is therefore sufficient, according to the invention, for an anion to have the corresponding $pK_a$ either in water or in dimethyl sulfoxide. Dimethyl sulfoxide is used particularly when the anion is not readily soluble in water. Information on the two solvents may be found in standard reference works.

The protic acid is therefore preferably not a protic acid of the halogens which have a $pK_a$ of less than 1; in particular, it is not HCl and not HBr and the anion is correspondingly not chloride or bromide.

Particular preference is given to carboxylic acids, i.e. protic acids of the above carboxylates of the general formulae:

$R^aCOO^-$ and $R^e(-COO^-)_f$

As such carboxylic acids or carboxylates, particular mention may be made of organic compounds which have from 1 to 20 carbon atoms and comprise one or two carboxylate groups, preferably one carboxylate group.

The carboxylic acids or carboxylates can be aliphatic or aromatic compounds. Here, aromatic compounds are compounds comprising aromatic groups. Particular preference is given to aliphatic or aromatic compounds which apart from the oxygen atoms of the carboxylate group comprise no further heteroatoms or at most comprise one or two hydroxyl groups, carbonyl groups or ether groups. Very particular preference is given to aliphatic or aromatic compounds which comprise no further heteroatoms in addition to the oxygen atoms of the carboxylate group.

As compounds having two carboxylate groups, mention may be made of, for example, the anions of phthalic acid, of isophthalic acid, of C2-C6-dicarboxylic acids, e.g. oxalic acid, malonic acid, succinic acid, glutaric acid, adipic acid.

As compounds having one carboxylate group, mention may be made of the anions of aliphatic, aromatic, saturated or unsaturated C1-C20-carboxylic acids, in particular alkanecarboxylic acids, alkenecarboxylic acids, alkynecarboxylic acids, alkadienecarboxylic acids, alkatrienecarboxylic acids, hydroxycarboxylic acids or ketonecarboxylic acids or aromatic carboxylic acids such as benzoic acid or phenylacetic acid. Suitable alkanecarboxylic acids, alkenecarboxylic acids and alkadienecarboxylic acids are also known as fatty acids.

As anions $Y^-$, mention may be made of, in particular, the benzoate anion and the anions of C1-C20-alkanecarboxylic acids, which may optionally be substituted by one or two hydroxy groups, preferably one hydroxy group. Particular preference given to the benzoate anion and the anions of C2-C20-alkanecarboxylic acids, in particular the acetate anion and propionate anion, with very particular preference being given to the acetate anion and correspondingly acetic acid as protic acid.

Further preferred protic acids or preferred anions of protic acids are, apart from carboxylic acids (carboxylates), also sulfonic acid, phosphoric acid or phosphonic acid, with the acid groups of the sulfonic acid, phosphoric acid or phosphonic acid being able to be partially esterified.

As phosphoric acid and esters thereof, mention may be made of, in particular, compounds of the formula VII

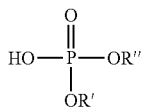

where R' and R" are each, independently of one another, hydrogen or a C1-C10-, preferably C1-C4-alkyl group.

As phosphonic acid and esters thereof, mention may be made of, in particular, compounds of the formula VIII

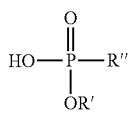

where R' and R" are each, independently of one another, hydrogen or a C1-C10-, preferably C1-C4-alkyl group.

Method of Carrying Out the Process

The reaction of the starting compounds is preferably carried out in water, a water-miscible solvent or mixtures thereof.

Water-miscible solvents are, in particular, protic solvents, preferably aliphatic alcohols or ethers having not more than 4 carbon atoms, e.g. methanol, ethanol, methyl ethyl ether, tetrahydrofuran. Suitable protic solvents are miscible with water in any ratio (at 1 bar, 21° C.).

The reaction is preferably carried out in water or mixtures of water with the above protic solvents. The reaction is particularly preferably carried out in water.

The reaction of the starting components can be carried out at, for example, pressures of from 0.1 to 10 bar, in particular atmospheric pressure, and, for example, at temperatures of from 5 to 100° C., in particular from 5 to 50° C., particularly preferably from 10 to 40° C.

The starting components can be combined in any order.

The reaction can be carried out batchwise, semicontinuously or continuously. In the semicontinuous mode of operation, it is possible, for example, for at least one starting compound to be initially charged and the other starting components to be metered in.

In the continuous mode of operation, the starting components are combined continuously and the product mixture is discharged continuously. The starting components can be fed in either individually or as a mixture of all or part of the starting components. In a particular embodiment, the amine and the acid are mixed beforehand and fed in as one stream, while the other components can be fed in either individually or likewise as a mixture (2nd stream).

In a further particular embodiment, all starting components comprising carbonyl groups (i.e. the α-dicarbonyl compound, the aldehyde and the protic acid of the anion X if the latter is a carboxylate) are mixed beforehand and fed in together as a stream; the remaining amino compound is then fed in separately.

The continuous preparation can be carried out in any reaction vessels, i.e. in a stirred vessel. It is preferably carried out in a cascade of stirred vessels, e.g. from 2 to 4 stirred vessels, or in a tube reactor.

The reaction proceeds in principle according to the following reaction equation.

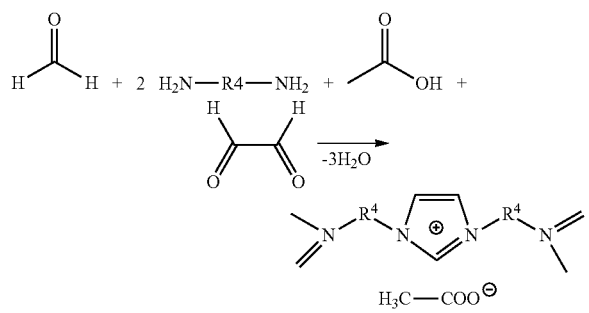

Here, 1 mol of aldehyde, 2 mol of primary amino groups and 1 mol of acid group ($H^+$) of the protic acid are required per 1 mol of α-dicarbonyl compound. In the polymer obtained, the imidazolium groups are joined to one another by the diamine.

High molecular weights can be achieved when the compounds are used in the above, equimolar amounts.

After the polycondensation reaction has been carried out, the polymeric compounds obtained can precipitate from the solution or remain in solution. Solutions of the polymeric ionic imidazolium compounds are preferably obtained.

The polymeric compounds can also be separated off from the solutions by customary methods. In the simplest case, the solvent, e.g. water, can be removed by distillation or by spray drying.

The process of the invention makes it possible to obtain polymeric, ionic imidazolium compounds.

In a particular embodiment, polymeric, ionic imidazolium compounds can be obtained by a process according to the invention in which less than 50 mol % of the amino compounds used are compounds having a hydroxyl group in the β position relative to the primary amino group or the concomitant use of such amino compounds having a hydroxyl group in the β position relative to the primary amino group has been dispensed with entirely.

The polymeric, ionic imidazolium compounds which can be obtained by the process of the invention can have any anionic counterion; the anionic counterion does not necessarily have to be a halide, e.g. a bromide; a halide anion or bromide anion can therefore be excluded if desired.

Novel polymeric, ionic imidazolium compounds can therefore be obtained by a process according to the invention in which less than 50 mol % of the amino compounds used are compounds having a hydroxyl group in the β position relative to the primary amino group and no acid having a bromide anion is used as protic acid.

The number average molecular weight Mn of the polymeric, ionic imidazolium compounds can, in a preferred embodiment, be greater than 500 g/mol, in particular greater than 1000 g/mol, or even greater than 2000 g/mol and greater than 5000 g/mol.

Mn can also, for example, assume values in the range from 500 to 500 000 g/mol, in particular from 500 to 50 000 g/mol.

The polydispersity (ratio of weight average molecular weight and number average molecular weight Mw/Mn) can have, for example, values of from 1.1 to 100, in particular from 1.5 to 20.

The molecular weights can be determined by gel permeation chromatography; what has been said above applies to the molecular weights determined in this way.

Preferred polymeric, ionic imidazolium compounds have cationic imidazolium polymers having structural units of the formula IV

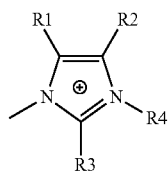

where R1, R2, R3 and R4 are as defined above, with the exception that R4 here is an (n−1)-valent organic radical which does not comprise a hydroxyl group in the β position relative to the nitrogen atom of the imidazole ring and the associated anions are not bromide.

Linear, polymeric, ionic imidazolium compounds which can be obtained by use of diamines as amino compound preferably have cationic imidazolium polymers having structural units of the formula V

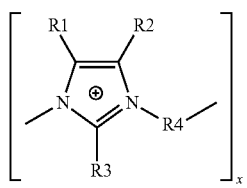

where x is an integer, R1, R2 and R3 and R4 are as defined above, with the exception that R4 here is an organic radical which does not comprise a hydroxyl group in the β position relative to the nitrogen atom of the imidazole ring and the associated anions are anions whose protic acid has a $pK_a$ of greater than 1. It may be remarked here that the preparative process naturally gives polymers having different chain lengths, so that the average value of x in the mixture obtained can have any values and is usually not an integer.

The polymeric, ionic imidazolium compounds of the invention comprise the cationic imidazolium polymer and the counteranion. The cationic imidazolium polymer comprises, in a preferred embodiment, more than 60% by weight, in particular more than 80% by weight and particularly preferably more than 90 or more than 95% by weight, of structural units of the above formulae IV or V.

The structural formulae of the cationic imidazolium polymer are shown schematically below for some ionic imidazolium compounds according to the invention:

a) polymer derived from formaldehyde, glyoxal and butane-diamine

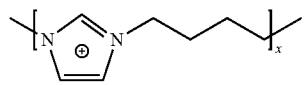

b) polymer derived from formaldehyde, glyoxal and triaminoethylenamine

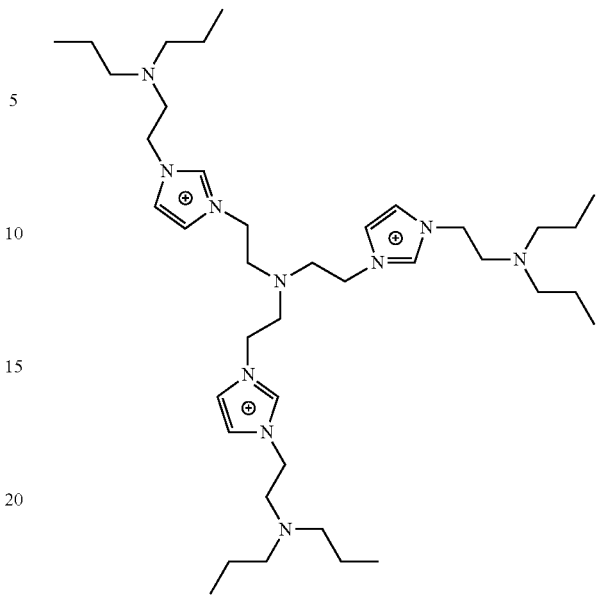

c) polymer derived from formaldehyde, glyoxal and polyvinylamine

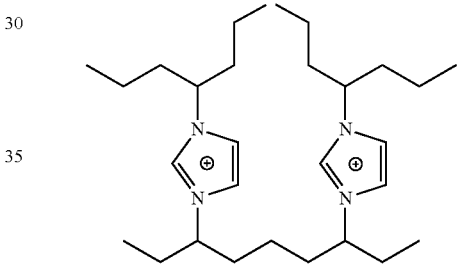

The polymeric, ionic imidazolium compounds are suitable for any applications in which ionic polymers are used. In particular, they are suitable, for example, as dispersants for inorganic or organic particles, in particular for dispersing these particles in aqueous systems.

EXAMPLES 1 TO 9

The procedure for examples 1 and 2 is described in the table. The preparation of the polymers in examples 3 to 9 was carried out according to the preparative method in example 2.

TABLE 1
with examples 1 to 9

| Example | | | | | |
|---|---|---|---|---|---|
| 1 | H₂N—(CH₂)₄—NH₂<br>1 mol | formaldehyde<br>1 mol (36.5% strength in water) | glyoxal<br>1 mol (40% strength in H2O) | acetic acid<br>1 mol | 1 mol of formalin, 1 mol of glyoxal and 1 mol of glacial acetic acid are placed in a reaction vessel. 1 mol of 1,4-butanediamine (melted by means of a hairdryer, m.p. 25–28° C.) are added dropwise at RT (exothermic, icebath cooling). Mixture is stirred overnight at RT. The black-brown mixture is evaporated on a rotary evaporator at a maximum of 70° C. (1 mbar) (foams, codistilled with EtOH/toluene), product P1: dark brown rubber). | P1 structure | According to H— and C-NMR: (P1 dissolved in H2O for 8 h at 80° C., about 2% strength solution) |
| 2 | H₂N—(CH₂)₄—NH<br>1 mol | formaldehyde<br>1 mol (36.5% strength) | glyoxal<br>1 mol (40% strength in H2O) | acetic acid<br>1 mol | 1 mol of formalin, 1 mol of glyoxal and 1 mol of glacial acetic acid are placed in a reaction vessel. 1 mol of 1,4-butanediamine (melted by means of a hairdryer, m.p. 25–28° C.) is added dropwise at RT (exothermic, icebath cooling). Mixture is stirred overnight at RT. The black-brown mixture (rubber-like) is transferred with H2O into a single-neck flask. | P2 structure | |

TABLE 1-continued with examples 1 to 9

| Example | | | | |
|---|---|---|---|---|
| Example 3 | H₂N-(CH₂)₆-NH₂ 1 mol | HCHO 1 mol (36.5% strength) | OHC-CHO 1 mol (40% strength in H2O) | CH₃COOH 1 mol | P3 black-brown viscous rubber-like oil |
| Example 4 | H₂N-(CH₂)₈-NH₂ 1 mol | HCHO 1 mol (36.5% strength) | OHC-CHO 1 mol (40% strength in H2O) | CH₃COOH 1 mol | P4: black-brown viscous rubber-like oil |

TABLE 1-continued with examples 1 to 9

| Example | | | | |
|---|---|---|---|---|
| 5 | H₂N−(CH₂)₄−NH₂ 1 mol | formaldehyde 1 mol (36.5% strength); glyoxal 1 mol (40% strength in H2O); adipic acid 0.5 mol | P5: dark brown, partly solid, partly viscous oil | poly(imidazolium) with adipate counterion |
| 6 | H₂N−(CH₂)₄−NH₂ 1 mol | formaldehyde 1 mol (36.5% strength); glyoxal 1 mol (40% strength in H2O); terephthalic acid 1 mol | P6: dark brown, partly solid, partly viscous oil | poly(imidazolium) with terephthalate counterion |

TABLE 1-continued
with examples 1 to 9
| Example | | | | |
|---|---|---|---|---|
| Example 7 |  1 mol |  1 mol (36.5% strength) / 1 mol (40% strength in H2O) / 1 mol | | P7: dark brown viscous oil  |
| Example 8 |  1 mol |  1 mol (36.5% strength) / 1 mol (40% strength in H2O) / 1 mol | | P8: dark brown "rubber"  |

TABLE 1-continued with examples 1 to 9

| Example | | | | | |
|---|---|---|---|---|---|
| 9 | [tris(2-aminoethyl)amine] 4 mol | [formaldehyde] 3 mol (36.5% strength) | [glyoxal] 3 mol (40% strength in H2O) | [acetic acid] 9 mol | P9: dark brown viscous oil [structure shown] |

Abbreviations:
RT: Room temperature, about 21° C.;
P: Product

The invention claimed is:

1. A process for preparing polymeric, ionic compounds comprising imidazolium groups, said process comprising reacting
an α-dicarbonyl compound,
an aldehyde,
at least one amino compound having at least two primary amino groups,
optionally an amino compound having only one primary amino group, and
a protic acid,
wherein carbonyl groups of the α-dicarbonyl compound and of the aldehyde are optionally present as hemiacetal, acetal or hemiketal or ketal groups.

2. The process according to claim 1, wherein the α-dicarbonyl compound is a compound of the formula (I):

R1-CO—CO—R2    (I), where R1 and R2 are each, independently of one another, an H atom or an organic radical having from 1 to 20 carbon atoms.

3. The process according to claim 1, wherein the α-dicarbonyl compound is glyoxal.

4. The process according to claim 1, wherein the aldehyde is an aldehyde of the formula (II):

R3-CHO    (II), where R3 is an H atom or an organic radical having from 1 to 20 carbon atoms.

5. The process according to claim 1, wherein the aldehyde is formaldehyde.

6. The process according to claim 1, wherein the at least one amino compound is a compound of the formula (III):

(NH2-)$_n$R4    (III), where
n is an integer greater than or equal to 2; and
R4 is any n-valent organic radical.

7. The process according to claim 1, wherein the at least one amino compound is an aliphatic or aromatic diamine or triamine.

8. The process according to claim 1, wherein the at least one amino compound is a C2-C20-alkylenediamine.

9. The process according to claim 1, wherein the at least one amino compound is a mixture of different amino compounds.

10. The process according to claim 1, wherein the protic acid is an acid of the formula $Y^{m-}(H^+)_m$, where m is an integer.

11. The process according to claim 10, wherein m is an integer from 1 to 4.

12. The process according to claim 1, wherein the protic acid is an acid with a $pK_a$ greater than 1.

13. The process according to claim 1, wherein the protic acid is a carboxylic acid, sulfonic acid, phosphoric acid or phosphonic acid, wherein acid groups of the sulfonic acid, phosphoric acid or phosphonic acid are optionally partially esterfied.

14. The process according to claim 1, wherein the protic acid is acetic acid.

15. The process according to claim 1, wherein the process is carried out in water, in a water-miscible solvent or a mixture thereof.

16. A polymeric, ionic imidazolium compound obtained by a process according to claim 1, wherein less than 50 mol % of the amino compounds are compounds having a hydroxyl group in the β position relative to the primary amino group and the anionic counterion to the cationic polymer is not bromide.

17. The polymeric, ionic imidazolium compound according to claim 16, wherein the number average molecular weight Mn, determined by gel permeation chromatography, is greater than 500.

18. The process according to claim 1, wherein the imidazolium groups of the polymeric, ionic compound are joined to one another by the amino compound having at least two primary amino groups.

* * * * *